3,006,876
UNSATURATED POLYESTER RESINS WHICH CURE IN THE PRESENCE OF AIR, AND TO A PROCESS OF PREPARING THE SAME
Hermann Delius, Hamburg-Lokstedt, and Wilhelm Becker, Hamburg Wandsbeck, Germany, assignors to Reichhold Chemicals, Inc., Detroit, Mich.
No Drawing. Filed June 26, 1958, Ser. No. 744,665
Claims priority, application Germany July 13, 1957
9 Claims. (Cl. 260—22)

The invention relates to unsaturated polyester resins which cure in the presence of air, and to a process of preparing the same.

It is a known and often very disturbing fact that in polymerization and copolymerization reactions, which are mostly carried out in the presence of radical forming organic compounds, the free access of air leads to polymerizates with tacky surfaces. This behavior is attributed to the so-called chainbreaking effect of the air-oxygen molecules which accumulate in the initial state of the polymerization and which permit in their effective range, therefore, particularly on the surface, the formation of relatively low-molecular and consequently tacky polymerizates. This appearance can also be observed in the so-called unsaturated polyester resins, provided that they consist of the usual composition, i.e. solutions of unsaturated polyesters in unsaturated monomeric, polymerizable vinyl compounds, such as for example styrene, whereby the unsaturated polyesters themselves are obtained from alpha, beta-unsaturated dicarboxylic acids, such as fumaric acid, maleic acid or similar acids, in some instances in a mixture of dicarboxylic acids free of non-benzoid unsaturation, such as phthalic acids, adipic acid and others, and poly-alcohols, particularly glycols of various kinds. In undisturbed polymerization of these unsaturated polyester resins, because of cross-linking, insoluble and practically infusible plastics are formed. Therefore, the polymerization process is, in this case, often called also a hardening process.

It is known that undisturbed hardening of unsaturated polyester resins may be obtained by eliminating the air-access during the process. This can be accomplished in the production of plastics by covering up the places which are not covered by the walls of the mold, for example with a cellulose hydrate foil, provided that the process is not carried out in completely closed mold. If unsaturated polyester resins are used in the manufacture of lacquer-like coatings, it has been suggested to add to these coating materials very small amounts of paraffin-like materials which, through the formation of a very thin film on places exposed to open air, slow down or prevent the access of the air-oxygen molecules, so that the hardening process takes place undisturbed. Both methods, which in their principles resemble each other, have disadvantages. The covering up with cellulose hydrate foils is hardly possible on large or complicated surfaces. Wax-like materials which are used as film-forming additions, such as paraffin, disturb the homogeneity of the through-hardened unsaturated polyester mixtures or films even if the dosage has been made with the utmost accuracy.

It has also been attempted, particularly with unsaturated polyester resins destined for surface coatings, to modify the original polyesters in their chemical composition in derivation of the usual structure, in order to obtain a polymerizability or hardenability without disadvantageous effects by means of air-oxygen, without using any mechanical measures or heterogeneous additions. For instance, the incorporation of specific polyols or diols, deriving from multinuclear cycloaliphatic compounds should lead to unsaturated polyester mixtures which harden in the air without disturbance. These specific polyalcohols can be obtained only gradually, starting from dicyclopentadienes or unsaturated bicyclic terpenes, through the so-called exosynthesis with subsequent reduction of the aldehydes. The patent application of Hermann Delius, Serial No. 655,181, filed April 26, 1957, now Patent No. 2,959,559, dated November 8, 1960, describes the production of modified unsaturated polyester resins, which, if dissolved in monomeric vinyl compounds, polymerize or harden tackfree despite the influence of air-oxygen. The modification was made by a proportional incorporation of a partially epoxydized unsaturated oil into the molecule of the unsaturated polyester resin, which otherwise consists of the usual components.

It has now been found that a new kind of unsaturated polyester resin may be obtained, which, dissolved in monomeric vinyl compounds, thru-harden into tackfree surfaces under access of air, if allylglycidyl ether is proportionately incorporated into the molecule of the unsaturated polyester. The allylglycidylether is obtainable by synthesis from allylalcohol and epichlorohydrin and is very well suited in the meaning of the present invention. It is advisable to prevent any disturbing copolymerization between vinyl- or allyl residues of the ether-alcohols and the double-linkings of the alpha, beta-unsaturated dicarboxylic acids, when the aforementioned vinyl- and allylethers of polyalcohols or allylglycidylether are processed with the addition of small amounts of inhibitors, such as hydroquinone. It is possible to produce an unsaturated polyester resin according to the present invention by simultaneous reaction of all components. However, it is preferable to produce as a first stage a partial ester from unsaturated and saturated dicarboxylic acids with the usual glycols, and then, as second stage, to add part of unsaturated etheralcohols by achieving a certain degree of esterification. Under the second working method, the unsaturated ether alcohol is exposed to the contact with the unsaturated dicarboxylic acids at high temperatures for a considerably shorter time, so that the danger of gelation by unwanted premature copolymerization is practically eliminated.

In processing allylglycidylether the reactivity of the epoxy group makes it possible, in the second step, to preserve reaction temperatures of 150° to 180° C., whereas, for example, with glycerylmonoallylether the esterification in the final stage must be terminated at about 200 to 210° C. In order to reduce the total functionability and the danger of a premature cross-linking, the co-use of monofunctional compounds, among others, in the form of monocarboxylic acids, such as for example fatty acids, resin acids and others, or higher monoalcohols, such as higher fatty alcohols and others, is advantageous. These materials serve also as viscosity regulators in the esterification reaction and make it possible to control the degree of esterification and to discontinue the reaction in the desired stage.

After completion of the esterification, the modified unsaturated polyesters are cooled down, mixed in a known manner with a small amount of inhibitor and dissolved in the desired quantity of a polymerizable monomeric vinyl compound, such as styrene.

The solutions of the unsaturated polyesters modified in accordance with the present invention in polymerizable vinyl compounds and after the addition of peroxide catalysts and accelerators, are valuable raw materials for lacquers, plastics, wood fillers, glues and others, and require in the processing no provisions for the exclusion of the air oxygen. In the application of surface coatings the outstanding ability for dry-polishing is a particularly advantageous quality.

*Example 1*

(a) 100 g. linseed oil fatty acids.
450 g. fumaric acid and
345 g. propanediol—1,2 are heated with inert gas within 2 hours to 200° C. and maintained at this temperature until the acid number has dropped to 70–80. The temperature is then decreased to 160° C., 0.250 g. of hydroquinone and subsequently 80 g. of allylglycidylether are added. After completed addition the temperature is again increased to 180° C. and maintained until a sample of the polyester dissolved in styrene in a ratio of 65:35 parts has, at room temperature, a viscosity T according to Gardner-Holdt. The acid number of the solution is approximately 20–25. At this moment, the polyester is cooled down to 100° C., and after the addition of 0.1 g. of hydroquinone is dissolved in 65% styrene monomer:

(b) 100 g. of polyester as produced according to 1a,
3 g. of a 10% cobalt naphthenate solution in styrene,
10 g. of styrene monomer and
7.5 g. of a 40% solution of methyl ethylene ketone hydroperoxide, or
6 g. of a 50% solution of cyclohexanone hydroperoxide, such as dimethyl phthalate are mixed together.

In order to obtain a varnish ready for immediate spraying a certain amount of acetone (3–5%) may be added, until the finished solution has a viscosity of 22–23 sec. measured in the DIN cup at 20° C. This solution is suited in unpigmented or in pigmented form for the spray-coating of wood or metal surfaces.

The varnish films, after their complete hardening, can be dry-polished very easily and brought to high gloss, a procedure which requires at room temperature approximately 20 hours.

To 100 g. of polyester produced according to Example 1 there are added 0.5% of a 6% cobalt naphthenate solution and 1.0% of 60% methyl ethyl ketone hydroperoxide. The ingredients are well mixed, and the resin mix is poured into an open mold. After two hours, the mass is cured and an article obtained with completely tackfree surfaces.

*Example 2*

492 g. of linseed oil
150 g. of glycerin
700 g. of partially hydrogenated rosin acid (trade name "Staybelite" with an acid number of 160–161 and an iodine number of 135 after Wijs)

are under stirring and injecting inert gas heated to 260° C. and esterified or re-esterified until an acid number of 2 is obtained and a sample of the intermediate in the cold can be diluted with ethyl alcohol.

128 g. of the intermediate
40 g. of linseed oil fatty acids
245 g. of ethylene glycol
350 g. of fumaric acid and
95 g. of phthalic anhydride are esterified, as described in Example 1a, until an acid number of about 80 is obtained. After cooling down to 160° C., 0.250 g. of hydroquinone and then 100 g. of allylglycidylether are added. The temperature is again increased to 180° C. and so maintained until a sample of the polyester dissolved in styrene in the ratio of 65:35 has, at room temperature, a viscosity R–S according to Gardner-Holdt. The acid number of the styrene solution is 20–25. After cooling to 100° C., another 0.1 g. of hydroquinone is added and the 65% polyester is dissolved in styrene. A varnish prepared with this polyester solution according to Example 1b gives films which applied on wood, after complete thru-hardening, can easily be dry-polished.

We claim:

1. A process of making tack-free film and articles with tack-free surfaces in the presence of air which comprises curing by copolymerization (A) a polymerizable monomeric vinyl compound, and (B) an unsaturated alkyd made by partially reacting in a first stage (1) at least one member of a group consisting of ethylenically unsaturated dicarboxylic acids and anhydrides thereof and mixtures thereof with a member of a group consisting of dicarboxylic acids and anhydrides thereof having no unsaturation other than benzoid, (2) at least one polyhydric alcohol, and (3) at least one member of a group consisting of unsaturated fat acids and rosin acids and mixtures thereof, and in a separate stage completing the reaction by the addition of (4) allyl glycidyl ether.

2. A process as set forth in claim 1, wherein ingredient (4) is used in the proportion of 8–15% by weight of the alkyd.

3. A process as set forth in claim 1 wherein (A) is styrene monomer.

4. A process as set forth in claim 1 wherein component (1) of the alkyd comprises fumaric acid.

5. A process as set forth in claim 1 wherein component (1) of the alkyd comprises a mixture of fumaric acid and phthalic anhydride.

6. A process as set forth in claim 1 wherein component (2) of the alkyd is propanediol 1,2.

7. A process as set forth in claim 1 wherein component (3) of the alkyd comprises linseed oil fatty acids.

8. A process as set forth in claim 1 wherein component (3) of the alkyd comprises a a mixture of linseed oil fatty acids and hydrogenated rosin acids.

9. A composition of matter capable of forming tack-free film and articles with tack-free surfaces in the presence of air by copolymerization, said composition comprising (A) a polymerizable monomeric vinyl compound, and (B) an unsaturated alkyd made by partially reacting in a first stage (1) at least one member of a group consisting of ethylenically unsaturated dicarboxylic acids and anhydrides thereof and mixtures thereof with a member of a group consisting of dicarboxylic acids and anhydrides thereof having no unsaturation other than benzoid, (2) at least one polyhydric alcohol, and (3) at least one member of a group consisting of unsaturated fat acids and rosin acids and mixtures thereof, and in a separate stage completing the reaction by the addition of (4) allyl glycidyl ether.

References Cited in the file of this patent

UNITED STATES PATENTS

| | | |
|---|---|---|
| 2,534,617 | Mohrman | Dec. 19, 1950 |
| 2,598,663 | Kropa | June 3, 1952 |
| 2,606,883 | Hoover | Aug. 12, 1952 |
| 2,680,105 | Baker | June 1, 1954 |
| 2,852,487 | Maker | Sept. 16, 1958 |